(No Model.)

M. M. MAYCOCK.
CHURN COVER FASTENER.

No. 296,985. Patented Apr. 15, 1884.

WITNESSES:
Donn Twitchell
C. Sedgwick

INVENTOR:
M. M. Maycock
BY Munn &co.
ATTORNEYS.

N. PETERS. Photo-Lithographer, Washington, D. C.

UNITED STATES PATENT OFFICE.

MARK MARSDEN MAYCOCK, OF BUFFALO, NEW YORK.

CHURN-COVER FASTENER.

SPECIFICATION forming part of Letters Patent No. 296,985, dated April 15, 1884.

Application filed December 29, 1883. (No model.)

*To all whom it may concern:*

Be it known that I, MARK M. MAYCOCK, of Buffalo, in the county of Erie and State of New York, have invented a new and Improved Churn-Cover Fastener, of which the following is a full, clear, and exact description.

My invention relates to improvements in churn-cover fasteners; and it consists in the peculiar construction and arrangement of the parts, as hereinafter more fully set forth, and pointed out in the claim.

Reference is to be had to the accompanying drawings, forming part of this specification, in which similar letters of reference indicate corresponding parts in all the figures.

Figure 1:
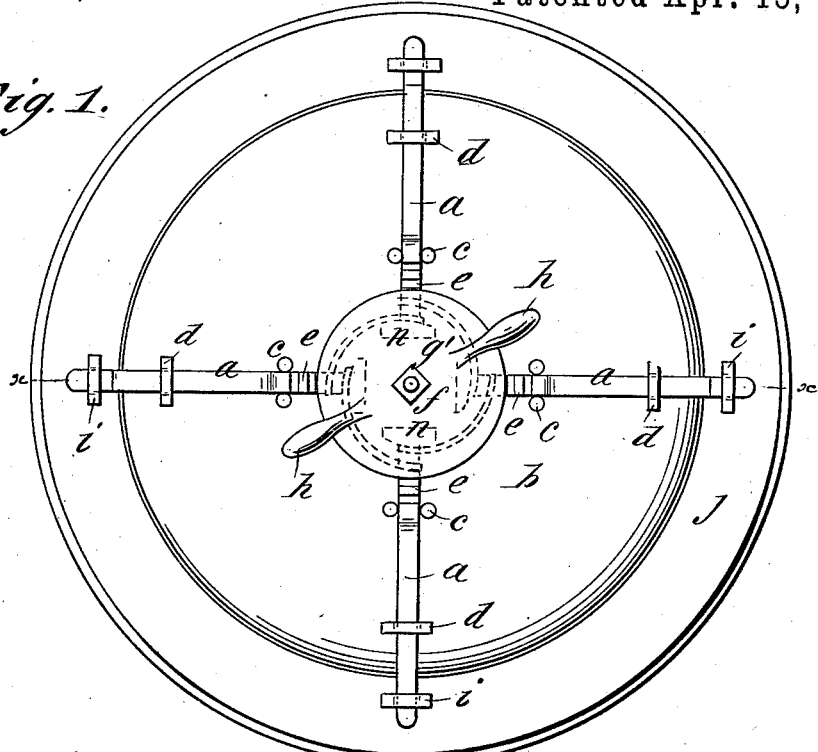
Figure 2:
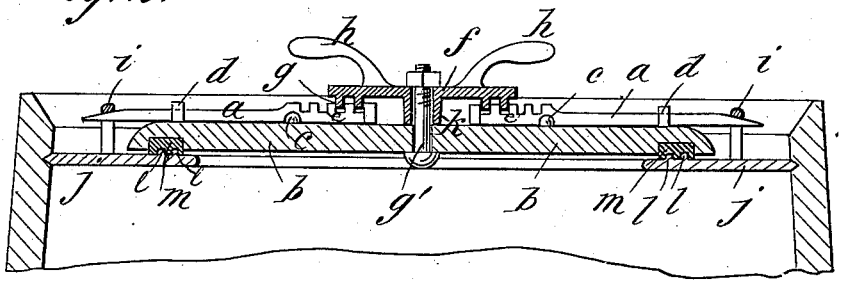
Figure 3:
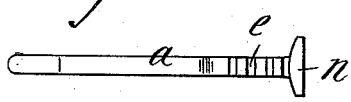
Figure 4:
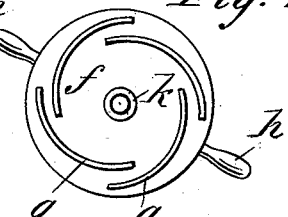

Figure 1 is a top view of the end of a barrel-churn on which the cover is fastened by my improved device. Fig. 2 is a section of the same on the line $x$ $x$ of Fig. 1. Fig. 3 is a plan view of one of the slide-bolts, and Fig. 4 is a plan view of the spirally-flanged disk for working the bolts inverted.

I arrange, preferably, four radial slide-bolts, $a$, on the top or outside of the cover $b$, in suitable guides, $c$ and $d$, and gear them by a toothed rack, $e$, on each, with the disk $f$, having spiral flange teeth $g$ on the under or inner side, and fitted to the cover by a pivot-bolt, $g'$, and also having handles $h$, by which to turn it readily to thrust the bolts $a$ out into staples $i$, attached to the head $j$, to secure the cover, or to withdraw said bolts to release the cover. The spirally-formed flanges $g$, secured to the lower face of the disk $f$, are each made separate, and there is one flange for each bolt—that is, if four bolts are employed, as shown in the drawings, four flanges $g$ are used; if three bolts are used, three flanges $g$ are employed, and if five bolts are used five flanges are employed—and the ends of each flange $g$ overlap the adjacent flanges $g$, leaving a small space between them, so that the ends of two adjacent flanges $g$ are made to enter the rack $e$ of a bolt and operate the latter, thus preventing all the strain and friction upon a bolt from being brought upon a single tooth or lug in the rear end of a bolt, as in the ordinary construction, thus wearing away said tooth and rendering the bolt inoperative.

Another advantage of my construction over that in which a spiral scroll is employed to operate a single tooth on the inner end of the bolt is that I avoid the wedging of the tooth in the scroll when the bolt is drawn back or inward, owing to the change of curvature, and consequent increase of friction, while in my construction the curvature of the flanges is uniform, and the wear is distributed upon the various teeth of the bolt, and consequently but slightly upon each tooth. The disk $f$ has a pivot-collar, $k$, surrounding the pivot-stud $g'$, and forming a bearing on the cover to support the disk sufficiently high to work above the toothed racks $e$, and the hole through this collar and the disk for the bolt $g'$ is sufficiently larger than the bolt, to allow the disk lateral play to center itself between the toothed racks, so as to wedge the slide-bolts in the staples $i$ all round to better effect than if the disk were held firmly on the pivot-bolt, in which case it might be bound fast by one or two of the slide-bolts while the others were slack, said slide-bolts being tapered on the ends which enter the staples $i$, wherein one or more may come to a bearing before the others.

The part $j$ represents the permanent head of the churn, which is preferably made of iron, with the center opening, over which the cover $b$ is applied, and with a couple of annular flanges, $l$, on the upper surface near the inner margin, for making a tight packing-joint with a ring of cork or other elastic packing, $m$, attached to the lower margin of the cover, the annular flanges $l$ being forced into the packing $m$.

I make the slide-bolts $a$ with a T-head, $n$, on the inner end, which resists the tendency of the bolts to roll by the friction of the flange-teeth $g$, and other causes, and thus considerably lessens the friction and wear of the teeth, and enables the cover-fastening to be worked easier than it otherwise would.

I am aware that a barrel-churn provided with a head having a central opening and perforated ears extending upwardly from the head, and a cover for the central opening provided with radially-sliding bolts, wedge-shaped at their outer ends and each having an upwardly-projecting lug at its inner end, which engage with a rotary disk having camgrooves, whereby the bolts are slid out and in, is old; and I therefore lay no claim to said invention.

Having thus described my invention, what I claim as new, and desire to secure by Letters Patent, is—

The combination, with the head $j$, having a central opening and staples $i$, and cover $b$, provided with the guides $c$ $d$, of the disk $f$, provided with the separate overlapping curved flanges $g$ on its under face, and handles $h$ and radially-sliding bolts $a$, each having a tapered outer end, a rack, $e$, near its inner end, and a T-head, $n$, substantially as shown and described.

MARK MARSDEN MAYCOCK.

Witnesses:
GEORGE A. MAYCOCK,
FRED M. INGLEHART.